United States Patent [19]

Mountz

[11] Patent Number: 4,491,194

[45] Date of Patent: Jan. 1, 1985

[54] VEHICLE LIFT RACK AND JACK ASSEMBLY

[75] Inventor: Craig E. Mountz, Wadsworth, Ill.

[73] Assignee: Ammco Tools, Inc., North Chicago, Ill.

[21] Appl. No.: 443,186

[22] Filed: Nov. 22, 1982

[51] Int. Cl.[3] .......... B60S 13/00

[52] U.S. Cl. .......... 187/8.43; 254/93 L

[58] Field of Search .......... 187/8.43, 8.41, 8.74, 187/8.75, 8.49, 8.5, 8.47, 8.52; 254/93 L, 89 H

[56] References Cited

U.S. PATENT DOCUMENTS 1,955,586 4/1934 Hott et al. .......... 187/8.52

3,563,345 2/1971 MacMillan et al. .......... 187/8.43

*Primary Examiner*—Joseph J. Rolla

*Assistant Examiner*—Kenneth Noland

*Attorney, Agent, or Firm*—Edmond T. Patnaude

[57] ABSTRACT

A jack assembly is pivotally mounted to a carriage which is in turn mounted by trolley wheels to a pair of track mounted rails and carries a wheel at its lower end for engagement with the floor as the tracks are lowered, thereby to pivot the jack assembly into a folded-up, generally horizontal position.

20 Claims, 4 Drawing Figures

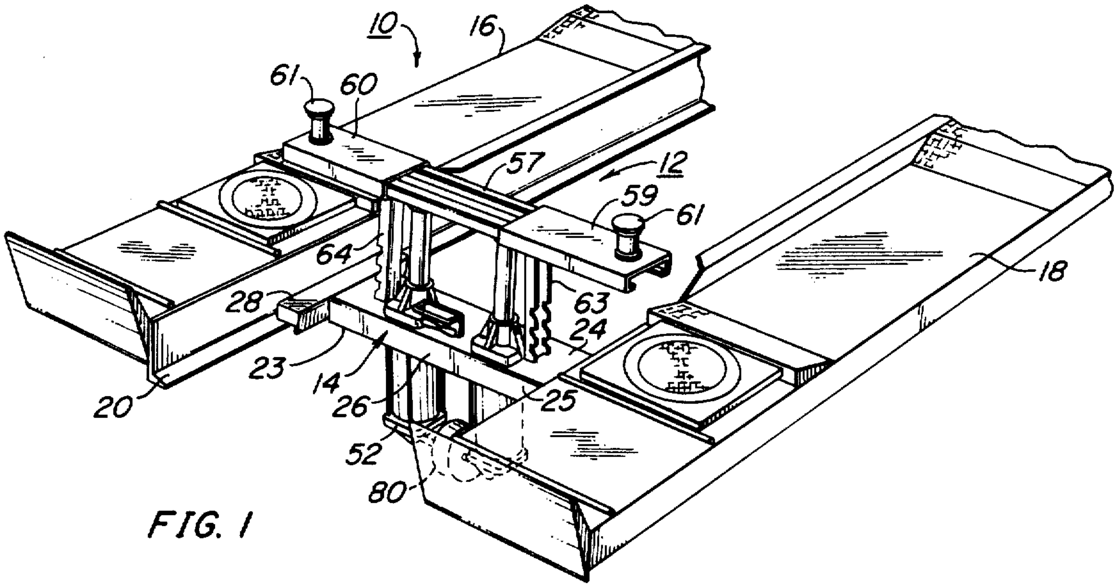
FIG. 1
FIG. 2
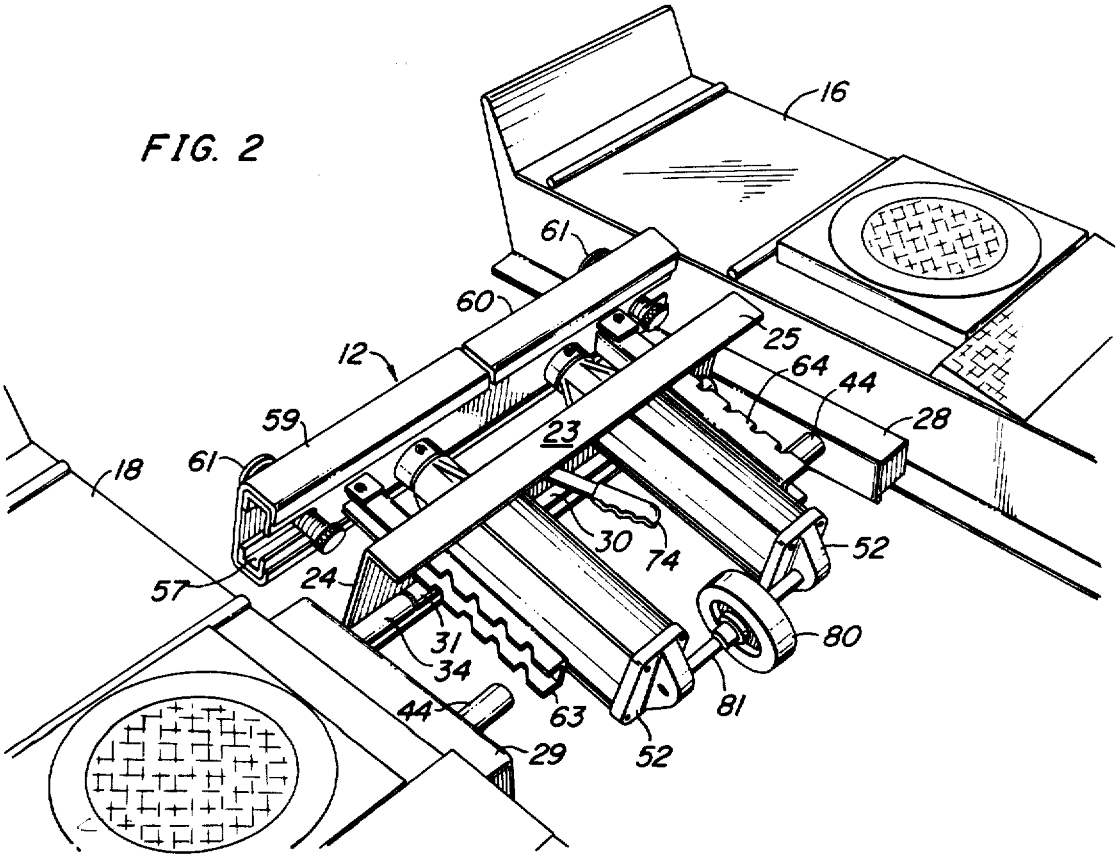

VEHICLE LIFT RACK AND JACK ASSEMBLY

The present invention generally relates to vehicle lift racks which include a carriage mounted, fluid operated jack for applying an upwardly directed force to selected parts of a vehicle located on the lift rack, and it relates in particular to a new and improved vehicle lift rack and jack assembly construction.

BACKGROUND OF THE INVENTION

Lift racks incorporating trolley mounted carriage and jack mechanisms are well known in the prior art. As evidenced, for example, by U.S. Pat. Nos. 3,563,345 and 4,050,545, it is also known to pivotally mount the jack mechanisms to the trolley mounted carriages so that the relatively tall jack mechanisms can be folded into a horizontal position to permit the lift racks to be lowered onto the floor. The former patent describes such a combination wherein the jack mechanism carries a track assembly which engages the floor as the rack is lowered to automatically pivot the jack mechanism into the folded-up, horizontal position.

It would be desirable to provide a lift rack and jack assembly of this general type but which is easier and safer to use, which is stronger, more durable in construction, and which is less expensive to manufacture and maintain then those known in the prior art.

SUMMARY OF THE INVENTION

Briefly, in accordance with the present invention there is provided a new and improved lift rack assembly which includes a trolley mounted carriage having a jack mechanism pivotally mounted thereto for automatic swinging movement between a generally horizontal, folded-up position when the lift rack is in a lowered position and an upright, vertical position when the lift rack is in an elevated position. The jack mechanism is mounted for swinging, pivotable movement about a horizontal axle offset by a substantial distance from the center of gravity of the swingable structure, and the jack mechanism automatically swings into an over center position as the lift rack is elevated whereby the jack mechanism does not swing out of the upright position when it is being used to apply an upward force to a vehicle located on the rack.

In accordance with other aspects of the invention a novel safety latch construction locks the jack mechanism in an elevated position to prevent spurious lowering of the jack mechanism, and a single wheel is mounted to the bottom of the jack mechanism to insure that the jack mechanism swings smoothly into the folded-up position as the lift rack is lowered.

GENERAL DESCRIPTION OF THE DRAWINGS

The present invention will be better understood by a reading of the following detailed description taken in connection with the accompanying drawing wherein:

FIG. 1 is a fragmentary, perspective view of a vehicle lift rack and jack assembly embodying the present invention, the lift rack being shown in an elevated position wherein the jack mechanism is in the upright, operative, jacking position;

FIG. 2 is a fragmentary, perspective view of the vehicle lift rack and jack assembly shown in FIG. 1 with jack mechanism in a folded-up condition;

DETAILED DESCRIPTION OF A PREFERRED EMBODIMENT OF THE INVENTION

Figure 3:
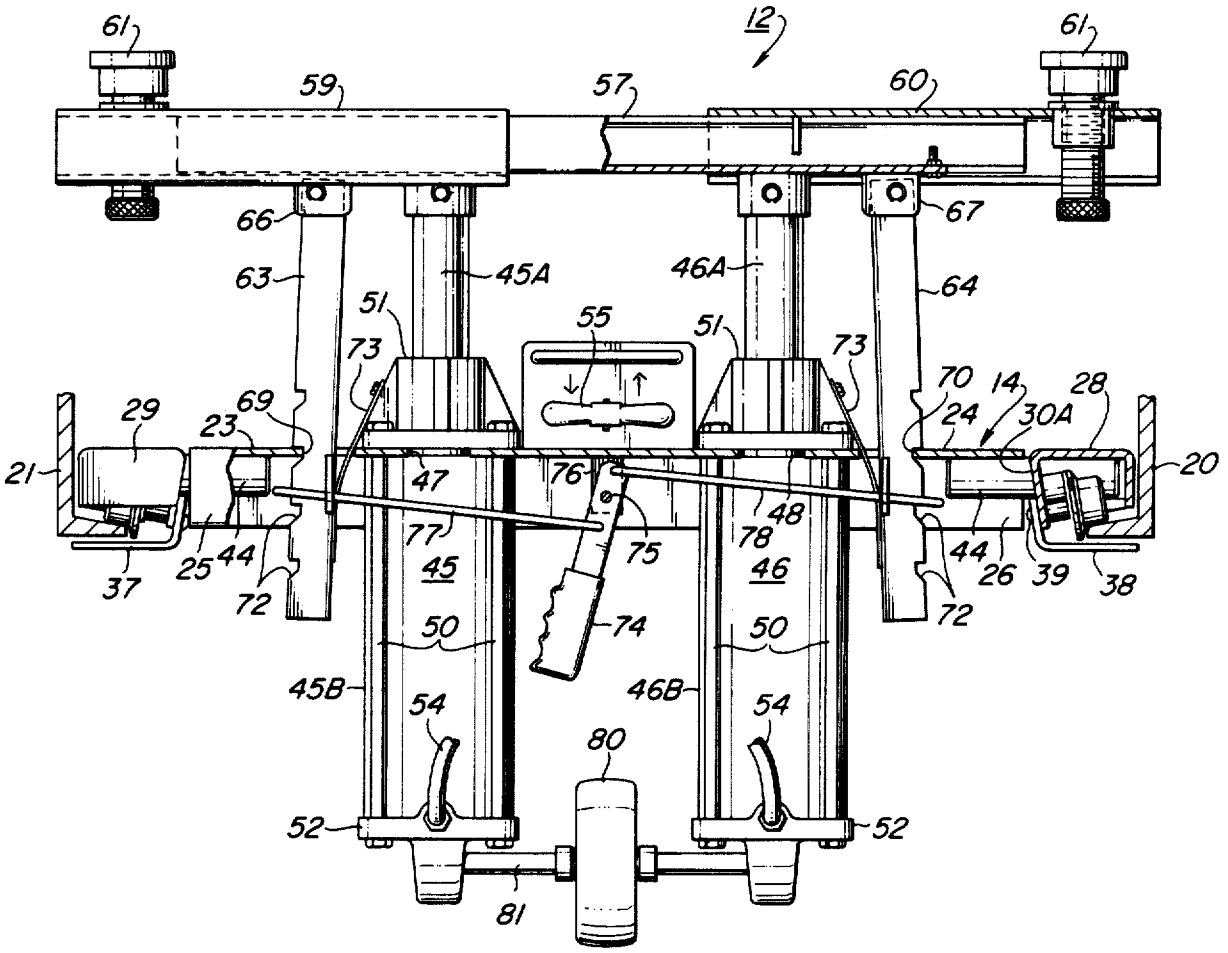
FIG. 3 is an elevational view, partly in cross-section, of the jack mechanism in the upright, jacking position.

Referring to FIGS. 1 and 2, there is shown a lift rack 10 and a jack mechanism 12 pivotally mounted to a carriage 14 disposed between a pair of parallel tracks 16 and 18. The carriage is supported by means of trolleys for movement along a pair of rails 20 and 21 fixedly mounted to the tracks and positioned along the respective inside edges of the tracks 16 and 18. The tracks 16 and 18 are connected together by one or more cross frame members, and a fluid operated piston-cylinder motor is provided to move the rack between a lowered position where it rests on the floor and an elevated position spaced a sufficient distance from the floor to enable a service technician to get under a vehicle located on the tracks.

The carriage 14 includes an inverted, rigid channel member 23 having a flat central web 24 and a pair of depending side flanges 25 and 26. In order to permit the member 23 to swing between the position shown in FIGS. 1, 3 and 4 and the position shown in FIG. 2, a pair of trolley wheel support housings 28 and 29 are pivotally mounted to the channel member 23 by means of a pivot shaft 30 which extends through a pair of bearing sleeves 31 and 32 fixedly secured as by welding to the web 24 and the side flange 25 of the channel frame member 23. The shaft 30 also extends through bearing sleeves 34 and 35 which are fixedly secured as by welding to the respective trolley support housings 29 and 30.

Figure 4:
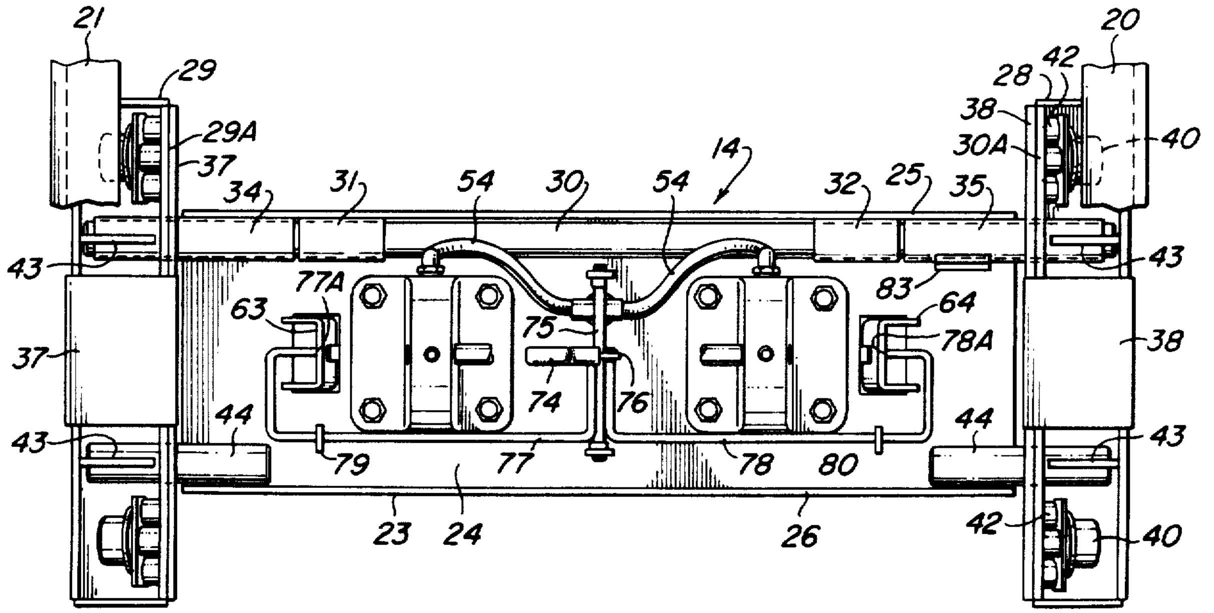
FIG. 4 is a bottom view of the jack mechanism shown in FIG. 3.

As best shown in FIGS. 3 and 4, the trolley support housings 29 and 30 are inverted channel pieces having depending inner side flanges 29A and 30A through which the bearing sleeves 34 and 35 respectively extend.

A pair of angle plates 37 and 38 are removably attached to the flanges 29A and 30A by means of a plurality of screws 39 and extend beneath the rails 20 and 21 to prevent the carriage from being inadvertently lifted off the rails. Each of the support members 29 and 30 carries two trolley wheels 40 which are rotatably mounted to the flanges 29A and 30A by a plurality of elastomeric mounts 42 which deflect under load when the jack mechanism is operated to apply a lifting force to a vehicle located on the lift rack. When the mounts deflect, the trolley wheels retract into the trolley wheel housings to permit a plurality of brake plates 43 carried by the supports 29 and 30 to rest on the rails 20 and 21 and thus prevent movement of the carriage along the rails. Two of the brake plates 43 are fixedly secured as by welding to the bottoms of the sleeves 34 and 35, and the other two brake plates 43 are fixedly secured to the bottoms of a pair of stop bars 44 which are affixed to the respective support members 29 and 30 and extend inwardly therefrom beneath the web 24 and along the inner side of the flange 26.

The manner in which the trolley wheels are mounted to the trolley wheel supports is described in greater detail in my copending application Ser. No. 445,067 filed Nov. 29, 1982 and assigned to the assignee of the present invention.

The jack mechanism 12 includes a pair of fluid-operated piston-cylinder motors 45 and 46 fixedly mounted to the web 24 of the channel member 23 with the respective piston rods 45A and 46A extending through openings 47 and 48 in the web 24. As best shown in FIGS. 3 and 4, the cylinders 45B and 46B are held tightly against the bottom of the web 24 by means of a plurality of the rods 50 which extend through aligned openings (not shown) in the web 24 and in upper and lower mounting caps 51 and 52. Fluid lines 54 extend from the lower ends of the cylinders 45B and 46B to a control valve 55 mounted on the upper side of the web 24 which is used to simultaneously control the operation of the piston-cylinders 51, 52 in the conventional manner.

Mounted to the tops of the piston rods 45A and 46A is a rigid tubular lifting frame 57 over the ends of which a pair of arm and pad assemblies 59 and 60 are telescopically mounted. Each of the assemblies 59 and 60 includes a manually adjustable lift pad 61.

In accordance with an important aspect of the present invention a pair of safety channel members 63 and 64 are pivotally mounted by brackets 66 and 67 to the bottom of the lifting frame 57 and respectively depend through rectangular openings 69 and 70 in the web 24. Each of the safety members 63, 64 has a plurality of ratchet teeth 72 and is outwardly biased by one of a pair of flat springs 73 mounted to the adjacent one of the end caps 51. In order to permit manual release of the safety members 63, 64 from the locking position shown in FIG. 3, an operating lever 74 is mounted by a pivot pin 75 to a bracket 76 depending from the web 24, and a pair of linkage rods 77 and 78 are respectively connected to the lever 74 at locations below and above the pivot pin 75 so that the linkage rods move simultaneously toward or away from the centerline of the bracket 76 when the lever 74 is pivotally actuated about the pivot axis. The linkage rods 77, 78 freely extend through guide brackets 79 and 80 and have U-shaped end portions with the distal ends 77A and 78A abutting the webs of the safety members 63 and 64 as best shown in FIG. 4. When the lever 74 is released, the springs 73 urge the safety members 63 and 64 outwardly into the locking positions against the outer edges of the openings 69 and 70 thereby preventing the jack mechanism from descending even though the piston-cylinder motors may be released.

In accordance with another aspect of the present invention a single wheel 80 is rotatably mounted on a horizontal axle 81 which has its ends mounted to the lower end caps 52. The rim of the wheel 80 is below the bottoms of the end caps 57 when the jack mechanism is in the upright position shown in FIGS. 1 and 3. Moreover, the diameter of the rim is greater than the corresponding widths of the end caps 52 so that the wheel 80 continuously engages the floor and rolls there along as the jack mechanism swings between the upright position and the generally horizontal, folded-up position shown in FIG. 2.

The center of gravity of the jack mechanism is slightly higher than the axis of the pivot shaft 30 and about midway between the flanges 25 and 26. In order to prevent the jack mechanism from remaining in the folded-up position when the rack is lifted from its lowermost position, a stop lug 83, best shown in FIG. 4, is affixed as by welding to the bearing sleeve 35. The stop lug 85 is engaged by the flange 25 when the carriage tilts to about eighty-five degrees from the vertical to prevent the center of gravity from moving below the pivot axis as the rack is lowered.

OPERATION

When the rack is in its lowermost position as shown in FIG. 2, the jack mechanism lies in a nearly horizontal plane with the wheel 80 resting on the floor. The trolley wheel mounts 42 hold the braking surfaces away from the rails 20 and 21 so that the entire carriage can be rolled along the rails to a desired storage location. When the rack is subsequently elevated, the frame member 23 and the jack mechanism pivot about the axis of the pivot shaft 30 until the web 24 rests on the stop bars 44 with the jack mechanism in an upright vertical position. The carriage can then be manually rolled to the desired position under a vehicle located on the tracks.

The service technician will then slidably position the arm and pad assemblies 59 and 60 and rotate the knobs on the pads 61 to position the pads against the parts of the vehicle to which the jacking force is to be applied. Actuation of the control handle of the valve 55 will then power the piston-cylinders 45, 46 to apply a vertically directed lifting force to the vehicle. At this time the trolley wheel mounts 42 will deflect until the braking surfaces 43 rest directly on the rails 20, 21 and thereby prevent travel of the jack mechanism along the rails.

As the lifting frame 57 moves up, the ramp edges of the teeth 72 on the safety bars 63, 64 ride along the outer edges of the openings 69, 70 while the safety bars pivot inwardly against the biasing forces of the springs 73. As the jack is lifted, the teeth on the safety bars snap seriatem into locking engagement with the outer edge portions of the openings 69, 70 to prevent inadvertent lowering of the vehicle of the rack should, for example the fluid pressure to the piston-cylinders 45, 56 be reduced.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. In combination, a pair of spaced, mutually parallel runways for carrying a vehicle, power lift means for elevating and lowering said runways relative to a floor disposed below said runways, a pair of rails respectively carried by said runways in mutually opposed relationship, a carriage assembly extending transversely between said runways and having trolley wheels journaled therein and resting on said rails to permit longitudinal travel of said carriage assembly along said rails, said carriage assembly including a rigid cross-frame and a pair of trolley wheel support members disposed at the respective ends of said cross-frame, pivot means connected between said cross-frame and said trolley wheel support members for permitting swinging movement of said cross-frame about a horizontal axis in proximity to one side of said cross-frame, fluid operated lift jack means fixedly mounted to said cross-frame and having a cylinder portion extending from the bottom thereof, the center of gravity of said carriage assembly and said lift jack means is above said horizontal axis when said carriage assembly is in an upright operative position, roller means carried by said cross-frame below said lift jack means for engagement with said floor when said runways are in a lower position for swinging said cross-frame and said lift jack means into a folded-up generally horizontal position as said runways are lowered from an elevated position, stop means carried by said carriage assembly for limiting the swinging movement of said cross-frame as said runways are elevated, and second stop means carried by said carriage assembly and interacting between said cross-frame and at least one of said trolley wheel supports to prevent said cross-frame and said lift jack means from swinging into a position wherein said center of gravity would be below said horizontal axis.

2. The combination according to claim 1 wherein said roller means comprises a single wheel rotatable on a horizontal axle disposed below said lift jack means and having an external diameter greater than the width of said jack means to space said jack means from said floor when said cross-frame and said lift jack means are in the folded-up position.

3. The combination according to claim 1 comprising manually releasable safety means carried by said cross-frame for preventing the accidental lowering of said lift jack means, said safety means including a ratchet member pivotably mounted to said lift jack means and extending through an opening in said cross-frame, said ratchet member having ratchet teeth along one side thereof for operative engagement with one side of said opening, spring means interposed between said cross-frame and said ratchet member for urging said ratchet member and said ratchet teeth into engagement with said one side of said opening, a lever pivotably mounted to said cross-frame, and linkage means connected between said lever and said ratchet member for moving said ratchet member out of operative engagement with said one side of said opening to permit the lowering of said jack means in response to pivotal movment of said lever.

4. The combination according to claim 3 wherein said safety means comprises a second ratchet member pivotably mounted to said lift jack means and extending through a second opening in said cross-frame, said second ratchet member having ratchet teeth along one side thereof for operative engagement with one side of said second opening, and second linkage means connected between said lever and said second ratchet member for moving said second ratchet member out of operative engagement with said one side of said second opening in response to said pivotal movement of said lever, whereby actuation of said lever simultaneously releases both said ratchet members to permit the lowering of said lift jack means.

5. The combination according to claim 4 wherein said lift jack means comprises two spaced apart fluid operated cylinders, said ratchet members being outboard of said cylinders, and said lever being disposed between said cylinders.

6. The combination according to claim 5 wherein said cross-frame comprises a channel having a central web and depending said flanges, and said linkage means extends along the bottom side of said central web between said side flanges.

7. The combination according to claim 6 wherein said lift jack means comprises a lifting frame extending parallel to said cross-frame and disposed above said cross-frame when said carriage assembly is in an upright position, said ratchet members being pivotally mounted to said lifting frame.

8. The combination according to claim 7 wherein said spring means comprises, first and second leaf springs respectively mounted to said lift jack means and resiliently biased against said ratchet members to urge the teeth of said ratchet members into locking engagement with said one side of said openings in said cross-frame.

9. The combination according to claim 1 wherein said cross-frame comprises a channel member having a planar central web and depending side flanges, said pivot means comprises a single elongated bar affixed to the bottom of said cross-frame adjacent one of said side flanges and extending outwardly from the ends of said cross-frame, said stop means comprises first and second bars affixed to the bottom of said cross-frame adjacent the other of said side flanges and extending outwardly from the ends of said cross-frame, said trolley wheel support members each comprising a rigid member having a side flange extending along the adjacent end of said cross-frame, said single elongated bar being journaled in proximity to its respective ends in said rigid member, and each of said side flanges having a recess in its lower edge for receiving a respective one of said first and second bars when the plane of said central web is substantially horizontal.

10. The combination according to claim 9 wherein said trolley wheel support members respectively comprise an inverted channel having a web, said side flanges and a second side flange, each of said trolley wheels being disposed within one of the inverted channels and rotatably mounted to said side flange.

11. The combination according to claim 10 wherein said trolley wheels are mounted to said side flanges of said trolley wheel support members by means of elastomeric mounting means which permit said trolley wheels to retract into said support members under the load of a vehicle on said jack means, and brake surfaces carried by said support members for abutment with said rails when said trolley wheels retract into said support members.

12. In combination, a pair of spaced, mutually parallel runways for carrying a vehicle, power lift means for elevating and lowering said runways relative to a floor disposed below said runways, a pair of rails respectively carried by said runways in mutually opposed relationship, a carriage assembly extending transversely between said runways and having trolley wheels journaled therein and resting on said rails to permit longitudinal travel of said carriage assembly along said rails, said carriage assembly including a rigid cross-frame and a pair of trolley wheel support members disposed at the respective ends of said cross-frame, pivot means connected between said cross-frame and said trolley wheel support members for permitting swinging movement of said cross-frame about a horizontal axis in proximity to one side of said cross-frame, fluid operated lift jack means fixedly mounted to said cross-frame and having a cylinder portion extending from the bottom thereof, roller means carried by said cross-frame below said lift jack means for engagement with said floor when said runways are in a lower position for swinging said cross-frame and said lift jack means into a folded up generally horizontal position as said runways are lowered from an elevated position, stop means carried by said carriage assembly for limiting the swinging movement of said cross-frame as said runways are elevated, manually releasable safety means carried by said cross-frame for preventing the accidental lowering of said lift jack means, said safety means including a ratchet member pivotably mounted to said lift jack means and extending through an opening in said cross-frame, said ratchet member having ratchet teeth along one side thereof for operative engagement with one side of said opening, spring means interposed between said cross-frame and said ratchet member for urging said ratchet member and said ratchet teeth into engagement with said one side of said opening, a lever pivotably mounted to said cross-frame, and linkage means connected between said lever and said ratchet member for moving said ratchet member out of operative engagement with said one side of said opening to permit the lowering of said jack means in response to pivotal movement of said lever.

13. The combination according to claim 12 wherein said safety means comprises a second ratchet member pivotably mounted to said lift jack means and extending through a second opening in said cross-frame, said second ratchet member having ratchet teeth along one side thereof for operative engagement with one side of said second opening, and second linkage means connected between said lever and said second ratchet member for moving said second ratchet member out of operative engagement with said one side of said second opening in response to said pivotal movement of said lever, whereby actuation of said lever simultaneously releases both said ratchet members to permit the lowering of said lift jack means.

14. The combination according to claim 13 wherein said lift jack means comprises tow spaced apart fluid operated cylinders, said ratchet members being outboard of said cylinders, and said lever being disposed between said cylinders.

15. The combination according to claim 14 wherein said cross-frame comprises a channel having a central web and depending said flanges, and said linkage means extends along the bottom side of said central web between said side flanges.

16. The combination according to claim 14 wherein said lift jack means comprises a lifting frame extending parallel to said cross-frame and disposed above said cross-frame when said carriage assembly is in an upright position, said ratchet members being pivotally mounted to said lifting frame.

17. The combination according to claim 16 wherein said spring means comprises, first and second leaf springs respectively mounted to said lift jack means and resiliently biased against said ratchet members to urge the teeth of said ratchet members into locking engagement with said one side of said openings in said cross-frame.

18. In combination a pair of spaced, mutually parallel runways for carrying a vehicle, power lift means for elevating and lowering said runways relative to a floor disposed below said runways, a carriage assembly extending transversely between said runways including a rigid cross-frame comprising a channel member having a planar central web and depending side flanges with a pair of trolley wheel support members disposed at the respective ends of said cross-frame having trolley wheels journaled therein and resting on said rails to permit longitudinal travel of said carriage assembly along said rails, said trolley wheel support members each comprising a rigid member having a side flange extending along the adjacent end of said cross-frame, pivot means connected between said cross-frame and said trolley wheel support members for permitting swinging movement of said cross-frame about a horizontal axis in proximity to one side of said cross-frame, said pivot means comprising a single elongated bar affixed to the bottom of said cross-frame adjacent one of said side flanges extending outwardly from the ends of said cross-frame, and being journaled in proximity to its respective ends in said rigid member, fluid operated lift jack means fixedly mounted to said cross frame and having a cylinder portion extending from the bottom thereof, roller means carried by said cross-frame below said lift jack means for engagement with said floor when said runways are in a lower position for swinging said cross-frame and said lift jack means into a foldedup generally horizontal position as said runways are lowered from an elevated position, stop means for limiting the swinging movement of said cross-frame as said runways are elevated including first and second bars affixed to the bottom of said cross-frame adjacent the other of said side flanges and extending outwardly from the ends of said cross-frame, and each of said side flanges having a recess in its lower edge for receiving a respective one of said first and second bars when the plane of said central web is substantially horizontal.

19. The combination according to claim 18 wherein said trolley wheel support members respectively comprise an inverted channel having a web, said side flanges and a second side flange, each of said trolley wheels being disposed within one of the inverted channels and rotatably mounted to said side flange.

20. The combination according to claim 19 wherein said trolley wheels are mounted to said side flanges of said trolley wheel support members by means of elastomeric mounting means which permit said trolley wheels to retract into said support members under the load of a vehicle on said jack means, and brake surfaces carried by said support members for abutment with said rails when said trolley wheels retract into said support members.

* * * * *